United States Patent
Chang et al.

(10) Patent No.: US 8,427,442 B2
(45) Date of Patent: Apr. 23, 2013

(54) TOUCH APPARATUS AND TOUCH SENSING METHOD

(75) Inventors: Ting-Yu Chang, Kaohsiung County (TW); Chih-Chang Lai, Taichung County (TW)

(73) Assignee: Wintek Corporation, Taichung (TW)

( * ) Notice: Subject to any disclaimer, the term of this patent is extended or adjusted under 35 U.S.C. 154(b) by 855 days.

(21) Appl. No.: 12/581,894

(22) Filed: Oct. 20, 2009

(65) Prior Publication Data
US 2010/0302180 A1 Dec. 2, 2010

(30) Foreign Application Priority Data
May 27, 2009 (TW) ............................. 98117785 A

(51) Int. Cl.
*G06F 3/041* (2006.01)
*G06F 3/045* (2006.01)
(52) U.S. Cl.
USPC ................................ 345/173; 178/18.05
(58) Field of Classification Search ......... 345/156–178; 178/18.01–18.11
See application file for complete search history.

(56) References Cited

U.S. PATENT DOCUMENTS

| | | | | |
|---|---|---|---|---|
| 5,181,030 A * | 1/1993 | Itaya et al. | ...................... | 341/20 |
| 5,792,997 A * | 8/1998 | Fukuzaki | ................... | 178/18.07 |
| 6,180,894 B1 * | 1/2001 | Chao et al. | ................. | 178/18.03 |
| 6,246,393 B1 * | 6/2001 | Watanabe et al. | ............. | 345/173 |
| 6,380,931 B1 * | 4/2002 | Gillespie et al. | .............. | 345/173 |
| 7,012,567 B2 * | 3/2006 | Osaka et al. | .................. | 342/433 |
| 8,179,373 B2 * | 5/2012 | Liu et al. | ........................ | 345/173 |
| 8,217,871 B2 * | 7/2012 | Lai et al. | ......................... | 345/87 |
| 8,248,383 B2 * | 8/2012 | Dews et al. | .................... | 345/173 |
| 8,274,485 B2 * | 9/2012 | Liu et al. | ....................... | 345/173 |
| 8,321,174 B1 * | 11/2012 | Moyal et al. | .................. | 702/150 |
| 2006/0262101 A1 * | 11/2006 | Layton et al. | ................. | 345/173 |
| 2007/0198926 A1 | 8/2007 | Joguet et al. | | |
| 2009/0009486 A1 * | 1/2009 | Sato et al. | ..................... | 345/174 |
| 2009/0027353 A1 * | 1/2009 | Im et al. | ........................ | 345/173 |
| 2009/0058825 A1 * | 3/2009 | Choi et al. | ..................... | 345/173 |
| 2009/0128545 A1 * | 5/2009 | Lee et al. | ...................... | 345/214 |
| 2009/0315858 A1 * | 12/2009 | Sato et al. | ..................... | 345/174 |

* cited by examiner

*Primary Examiner* — Rodney Amadiz
(74) *Attorney, Agent, or Firm* — Jianq Chyun IP Office

(57) ABSTRACT

A touch apparatus including a touch panel and a touch sensing circuit is provided. The touch panel includes a first transparent substrate, a plurality of first conductive patterns, a second transparent substrate, a plurality of second conductive patterns and a plurality of spacers. The touch sensing circuit includes a first demultiplexer, a second demultiplexer, a first multiplexer, a second multiplexer, a third multiplexer, a fourth multiplexer, a fifth multiplexer, a sixth multiplexer and an analog/digital converter (ADC). The fifth multiplexer and the sixth multiplexer are used for modulating a signal receiving range of the ADC and thus the touch sensing circuit is easily judge a correctness of a sensing signal.

11 Claims, 4 Drawing Sheets

TOUCH APPARATUS AND TOUCH SENSING METHOD

CROSS-REFERENCE TO RELATED APPLICATION

This application claims the priority benefit of Taiwan application serial No. 98117785, filed on May 27, 2009. The entirety of the above-mentioned patent application is hereby incorporated by reference herein and made a part of this specification.

BACKGROUND OF THE INVENTION

1. Field of the Invention

The present invention relates to a touch apparatus and a touch sensing method. More particularly, the present invention relates to a touch apparatus capable of determining a ghost point, and a touch sensing method thereof.

2. Description of Related Art

Regarding a resistance touch panel, the touch panel can be operated by any medium, so that a utilization convenience of the touch panel is improved. Moreover, the cost of the resistance touch panel is relatively low, and the technique of the resistance touch panel is relatively mature, so that a market share thereof is relatively high. However, to achieve a multi-touch function, a sensing wiring with higher density has to be configured on a same-sized panel in a layout structure of the resistance touch panel. Moreover, regarding a circuit design, a comparator is generally used to perform a complicated calculation to avoid a sensing error problem during the multi-touch operation.

SUMMARY OF THE INVENTION

The present invention is directed to a touch apparatus, which can correctly perform a multi-touch operation.

The present invention is directed to a touch sensing method, by which a sensing error problem can be avoided without performing a complicated calculation.

The present invention provides a touch apparatus including a touch panel and a touch sensing circuit. The touch panel includes a first transparent substrate, a plurality of first conductive patterns, a second transparent substrate, a plurality of second conductive patterns and a plurality of spacers. The first conductive patterns are disposed on the first transparent substrate. Each of the first conductive patterns is parallel to a first direction, and has a first end and a second end opposite to the first end along the first direction. The second transparent substrate is disposed opposite to the first transparent substrate. The second conductive patterns are disposed on the second transparent substrate, and the first conductive patterns and the second conductive patterns are located between the first transparent substrate and the second transparent substrate. Each of the second conductive patterns is parallel to a second direction, wherein the first direction is intersected to the second direction, and each of the second conductive patterns has a third end and a fourth end opposite to the third end along the second direction. The spacers are disposed between the first transparent substrate and the second transparent substrate.

The touch sensing circuit includes a first demultiplexer, a second demultiplexer, a first multiplexer, a second multiplexer, a third multiplexer, a fourth multiplexer, a fifth multiplexer, a sixth multiplexer and an analog/digital converter (ADC). The first demultiplexer is electrically coupled to each of the first ends for transmitting a first signal. The second demultiplexer is electrically coupled to each of the third ends for transmitting a second signal. The first multiplexer is electrically coupled to each of the third ends for receiving a first sensing signal output from each of the third ends. The second multiplexer is electrically coupled to each of the first ends for receiving a second sensing signal output from each of the first ends. The third multiplexer is electrically coupled to the first multiplexer and the second multiplexer for receiving the first sensing signal and the second sensing signal. The fourth multiplexer electrically couples the second ends and the fourth ends to a ground signal. The ADC is electrically coupled to the third multiplexer for outputting a first coordinate signal and a second coordinate signal. The fifth multiplexer and the sixth multiplexer are electrically coupled to the ADC, wherein the fifth multiplexer and the sixth multiplexer are used for modulating a signal receiving range of the ADC.

The present invention provides a touch sensing method used in the aforementioned touch apparatus. First, the first demultiplexer transmits the first signal to each of the first ends, respectively. When one of the first ends is input with the first signal, the first multiplexer sequentially electrically connects the third ends so as to perform a sensing on the second conductive patterns, and the sensed first sensing signal is transmitted to the ADC through the third multiplexer. When the first sensing signal falls within the signal receiving range, the ADC converts the first sensing signal to output the first coordinate signal. Next, the second demultiplexer transmits the second signal to each of the third ends, respectively. When one of the third ends is input with the second signal, the second multiplexer sequentially connects the first ends so as to perform the sensing on the first conductive patterns, and the sensed second sensing signal is transmitted to the ADC through the third multiplexer. When the second sensing signal falls inside the signal receiving range, the ADC converts the second sensing signal to output the second coordinate signal.

In the present invention, a plurality of multiplexers, a plurality of demultiplexers and an ADC are used to form the touch sensing circuit of the present invention, wherein the signal receiving range of the ADC is varied by the control of a part of the multiplexers. When the sensing signal received by the ADC does not fall within the signal receiving range, the ADC regards the sensing signal as an error sensing, and does not output a corresponding coordinate signal. Namely, the touch sensing method of the present invention can easily judge a correctness of the sensing signal. Therefore, the touch apparatus of the present invention can correctly perform a touch sensing without complicated calculations.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
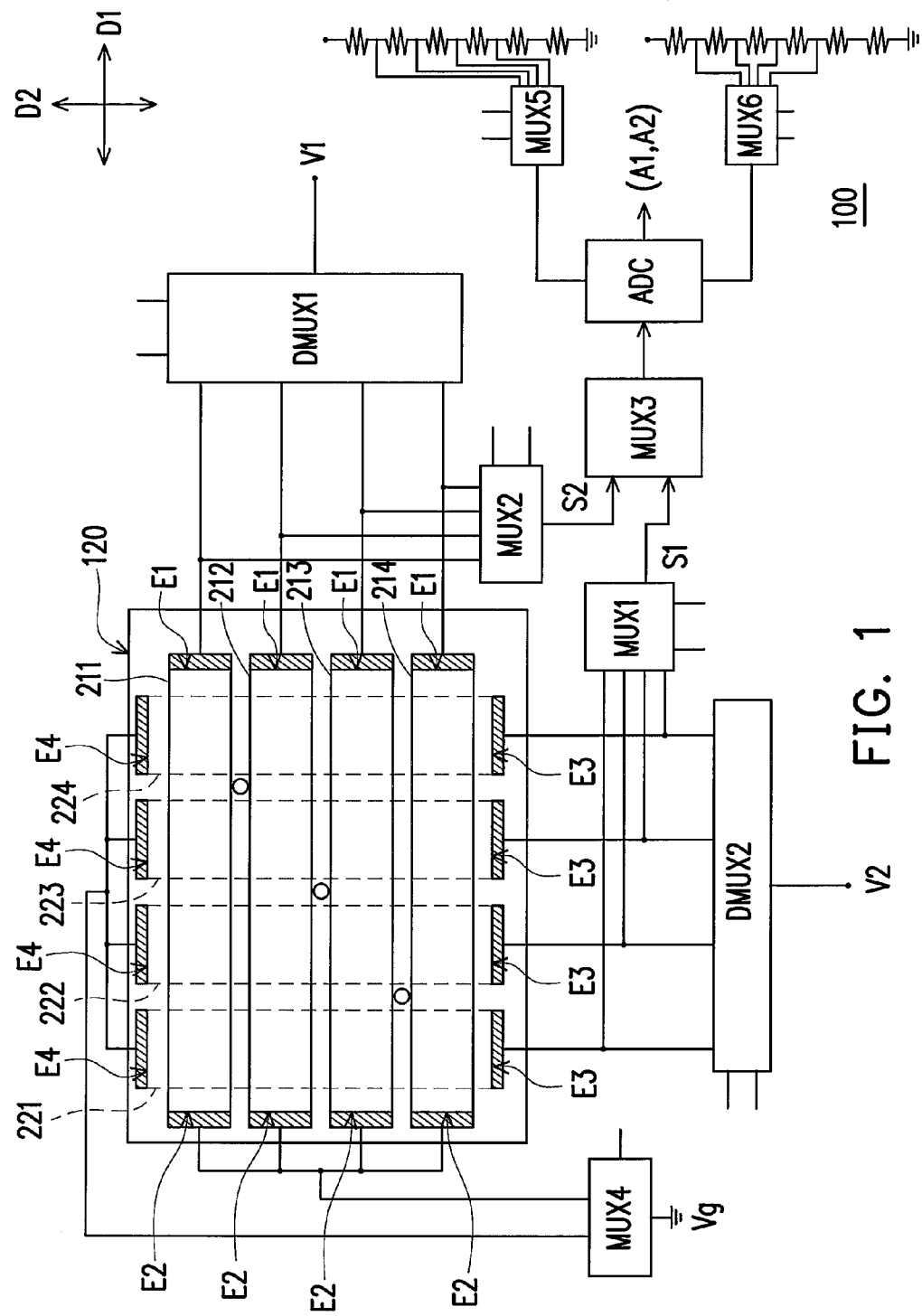
FIG. 1 is a schematic diagram illustrating a touch apparatus according to an embodiment of the present invention.
Figure 2A:
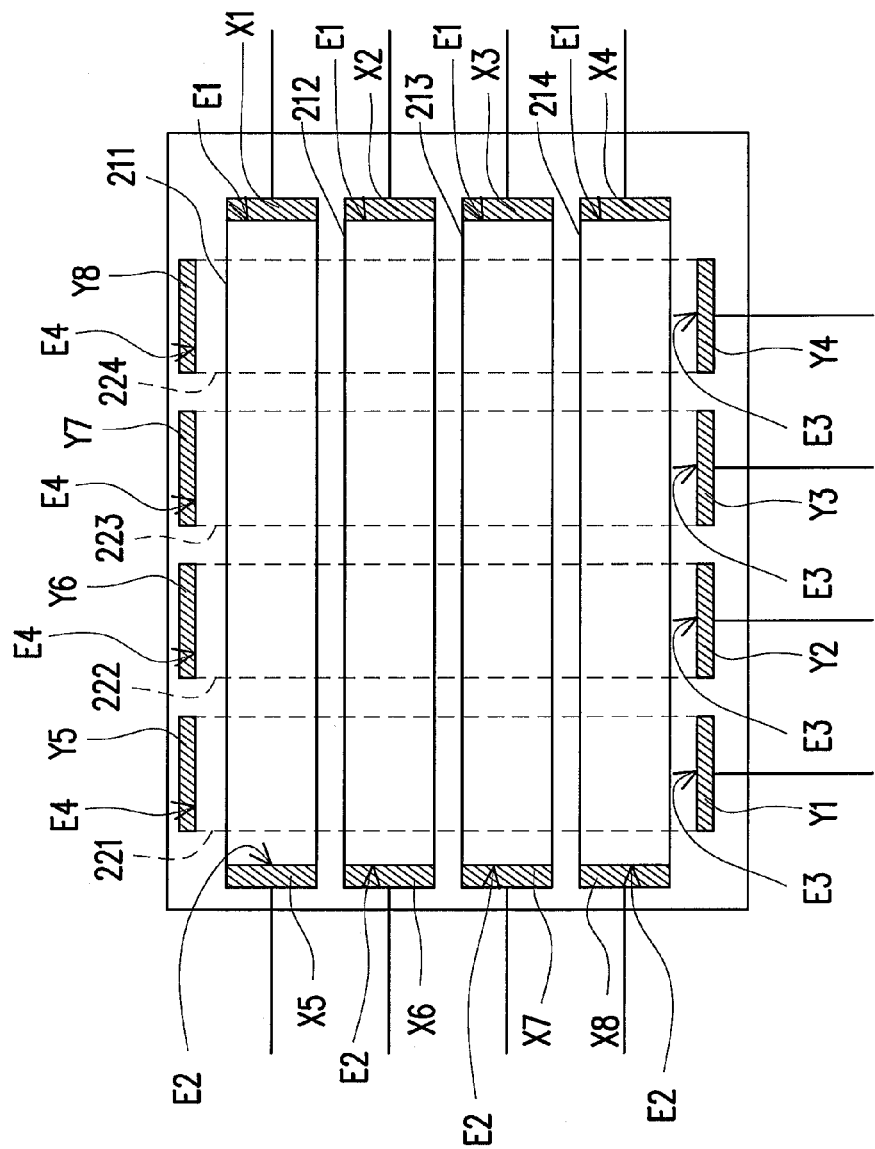
FIG. 2A and FIG. 2B are respectively a top view and a three-dimensional view of a touch panel of a touch apparatus according to an embodiment of the present invention.
Figure 2B:
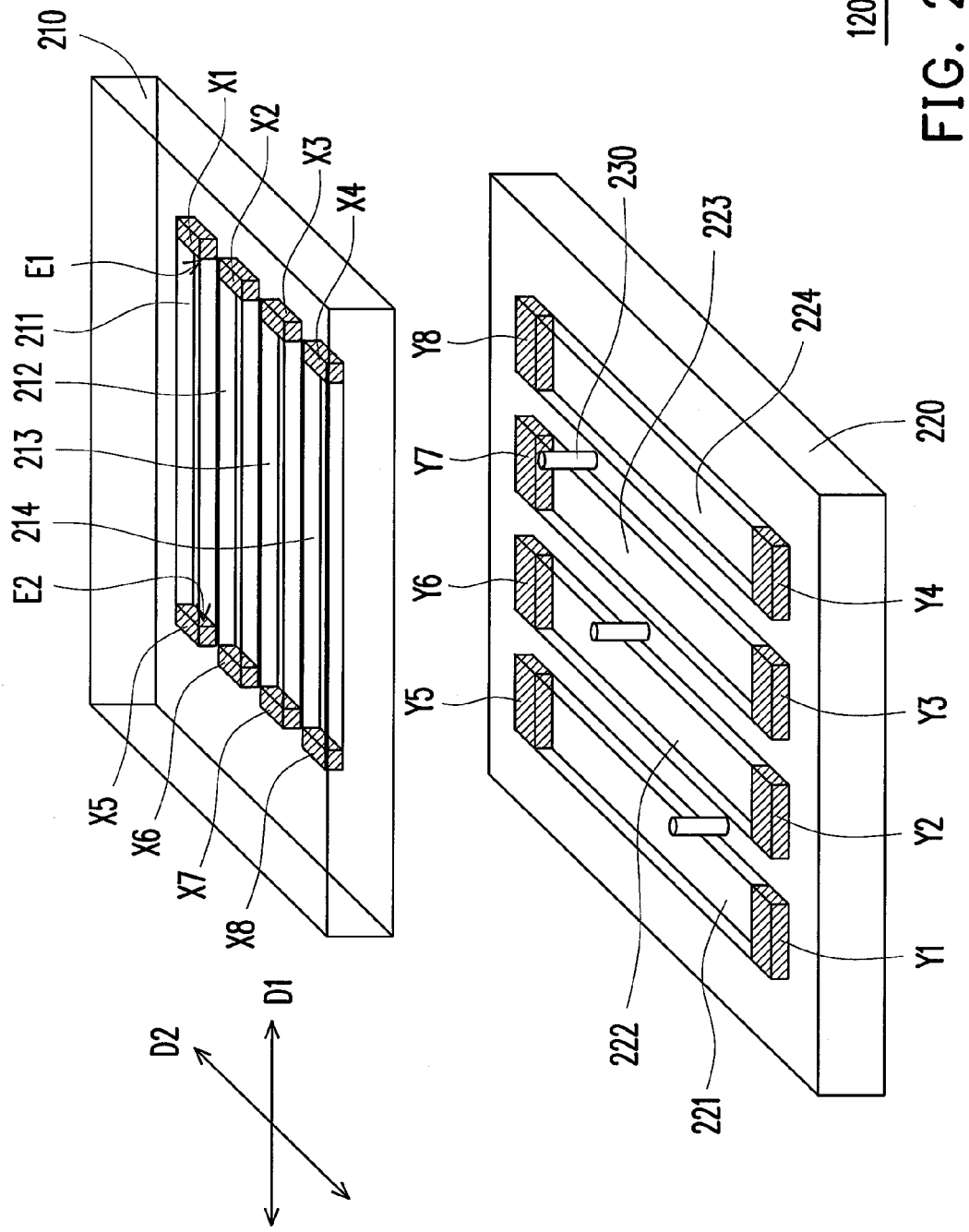

FIG. 1 is a schematic diagram illustrating a touch apparatus according to an embodiment of the present invention, and FIG. 2A and FIG. 2B are respectively a top view and a three-dimensional view of a touch panel of a touch apparatus according to an embodiment of the present invention. Referring to FIG. 1, the touch apparatus 100 includes a touch panel 120 and a touch sensing circuit (not marked) connected to the touch panel 120. The touch sensing circuit (not marked) includes a first demultiplexer DMUX1, a second demultiplexer DMUX2, a first multiplexer MUX1, a second multiplexer MUX2, a third multiplexer MUX3, a fourth multiplexer MUX4, a fifth multiplexer MUX5, a sixth multiplexer MUX6 and an analog/digital converter ADC.

Referring to FIG. 2A and FIG. 2B, the touch panel 120 includes a first transparent substrate 210, a plurality of first conductive patterns 211~214, a second transparent substrate 220, a plurality of second conductive patterns 221~224 and a plurality of spacers 230. The second transparent substrate 220 is disposed opposite to the first transparent substrate 210. The first conductive patterns 221~224 are disposed on the first transparent substrate 210. The second conductive patterns 221~224 are disposed on the second transparent substrate 220, and the first conductive patterns 211~214 and the second conductive patterns 221~224 are located between the first transparent substrate 210 and the second transparent substrate 220. The spacers 230 are disposed between the first transparent substrate 210 and the second transparent substrate 220.

Each of the first conductive patterns 211~214 is parallel to a first direction D1. Each of the first conductive patterns 211~214 has a first end E1 and a second end E2 opposite to the first end E1 along the first direction D1. Meanwhile, each of the second conductive patterns 221~224 is parallel to a second direction D2, wherein the first direction D1 is intersected to the second direction D2. Each of the second conductive patterns 221~224 has a third end E3 and a fourth end E4 opposite to the third end E3 along the second direction D2.

Moreover, to electrically connect the first ends E1, the second ends E2, the third ends E3 and the fourth ends E4 to electronic devices outside the touch panel 120, the touch panel 120 further includes a plurality of first electrodes X1~X4, a plurality of second electrodes X5~X8, a plurality of third electrodes Y1~Y4 and a plurality of fourth electrodes Y5~Y8. Each of the first electrodes X1~X4 is substantially disposed on the first end E1 of one of the first conductive patterns 211~214, and is electrically coupled to the first demultiplexer DMUX1 and the second multiplexer MUX2. Each of the second electrodes X5~X8 is substantially disposed on the second end E2 of one of the first conductive patterns 211~214, and is electrically coupled to the fourth multiplexer MUX4. Each of the third electrodes Y1~Y4 is substantially disposed on the third end E3 of one of the second conductive patterns 221~224, and is electrically coupled to the second demultiplexer DMUX2 and the first multiplexer MUX1. Each of the fourth electrodes Y5~Y8 is substantially disposed on the second end E4 of one of the second conductive patterns 221~224, and is electrically coupled to the fourth multiplexer MUX4. In detail, the second electrodes X5~X8 are, for example, electrically connected together, and the fourth electrodes Y5~Y8 are also electrically connected together. Moreover, in the present embodiment, a plurality of the second electrodes X5~X8 and a plurality of the fourth electrodes Y5~Y8 are taken as an example, but in the other embodiments, the amount of the electrodes connected to the second ends E2 and the fourth ends E4 can be only one. In other words, in the other embodiments, a bar-shape electrode can be used to connect all of the second ends E2, and another bar-shape electrode can be used to connect all of the fourth ends E4 such that the second ends E2 are connected physically and the fourth ends E4 are connected physically.

It should be noticed that the touch panel 120 formed by four first conductive patterns 211~214 and four second conductive patterns 221~224 is taken as an example in the present embodiment, but the present invention is not limited thereto. In the other embodiments, the touch panel 120 can be formed by the intersecting of more or less conductive patterns. The first conductive patterns 211~214 and the second conductive patterns 221~224 are partially overlapped, so that when a user presses the touch panel 120 to perform a touch operation, the part of the conductive patterns located at a touch position can be conducted to generate a corresponding sensing signal.

In detail, referring to FIG. 1 again, to generate the aforementioned sensing signal and convert the sensing signal into a corresponding coordinate signal, so as to determine the touch position and execute a corresponding function, configurations of a plurality of electronic devices in the touch apparatus 100 are described as follows.

The first demultiplexer DMUX1 is electrically coupled to the first ends E1. The second demultiplexer DMUX2 is electrically coupled to the third ends E3. The first multiplexer MUX1 is electrically coupled to the third ends E3. The second multiplexer MUX2 is electrically coupled to the first ends E1. The third multiplexer MUX3 is electrically coupled to the first multiplexer MUX1 and the second multiplexer MUX2. The fourth multiplexer MUX4 electrically couples the second ends E2 and the fourth ends E4 to a ground signal Vg. The analog/digital converter ADC is electrically coupled to the third multiplexer MUX3. The fifth multiplexer MUX5 and the sixth multiplexer MUX6 are electrically coupled to the analog/digital converter ADC.

In detail, when the touch apparatus 100 performs the touch sensing, the first demultiplexer DMUX1 transmits a first signal V1 to each of the first ends E1 to respectively form a certain voltage gradient distribution in the first conductive patterns 211~214. The second demultiplexer DMUX2 transmits a second signal V2 to each of the third ends E3 to respectively form a certain voltage gradient distribution in the second conductive patterns 221~224. When the user performs the touch operation, a part of the conductive patterns can be conducted to generate the corresponding sensing signal. In the meantime, the first multiplexer MUX1 receives a first sensing signal S1 output from one of the third ends E3, and the second multiplexer MUX2 receives a second sensing signal S2 output from one of the first ends E1. Moreover, the third multiplexer MUX3 receives the first sensing signal S1 and the second sensing signal S2, and transmits the first sensing signal S1 and the second sensing signal S2 to the analog/digital converter ADC.

The analog/digital converter ADC is used for outputting a first coordinate signal A1 and a second coordinate signal A2, wherein the fifth multiplexer MUX5 and the sixth multiplexer MUX6 are used for modulating a signal receiving range of the analog/digital converter ADC. Specifically, the analog/digital converter ADC determines whether or not to convert the received first sensing signal S1 and the received second sensing signal S2 into the first coordinate signal A1 and the second coordinate signal A2 according to the signal receiving range. In other words, when the first sensing signal S1 or the second sensing signal S2 does not fall within the signal receiving range, the analog/digital converter ADC regards the sensing signal as an error signal, and does not perform the signal conversion. Accordingly, a problem of error sensing occurred in the touch apparatus 100 such as ghost points can be effectively resolved. Namely, the touch apparatus 100 of the present embodiment has a high sensing correctness.

More specifically, a touch sensing method of the touch apparatus 100 includes following steps. First, the first demultiplexer DMUX1 transmits the first signal V1 to each of the first ends E1, respectively. Namely, the first conductive patterns 211~214 can sequentially perform a scanning. Meanwhile, all of the second ends E2 are electrically connected to the ground signal Vg, so that when one of the first ends E1 is input with the first signal V1, a specific voltage gradient distribution is existed in the corresponding first conductive patterns 211~214 along the first direction D1. When the first conductive patterns 211~214 and the second conductive patterns 221~224 are conducted at different positions along the first direction D1 by the touch of the user, the corresponding second conductive patterns 221~224 can thus receive different sensing signals. In the present embodiment, the first demultiplexer DMUX1 respectively transmits the first signal V1 to the first ends E1 through the first electrodes X1~X4.

Next, when one of the first ends E1 is input with the first signal V1, the first multiplexer MUX1 sequentially connects the third ends E3 for performing the sensing on the second conductive patterns 221~224, and the sensed first sensing signal S1 is transmitted to the analog/digital converter ADC through the third multiplexer MUX3. In other words, when the first demultiplexer DMUX1 enables one of the first conductive patterns 211~214 to perform the scanning, the first multiplexer MUX1 can enable the second conductive patterns 221~224 to sequentially perform the sensing.

For example, when a position P of the touch panel 120 is pressed, the first conductive pattern 211 and the second conductive pattern 221 are conducted at the position P. Therefore, during a process that the second conductive patterns 221~224 sequentially perform the sensing, only the second conductive pattern 221 can sense the corresponding first sensing signal S1. Since the other second conductive patterns 222~224 are not conducted to any of the first conductive patterns 211~214, the second conductive patterns 222~224 do not sense the sensing signal.

Next, when the first sensing signal S1 falls within the signal receiving range, the analog/digital converter ADC converts the first sensing signal S1 to output a first coordinate signal A1. In the present embodiment, the fifth multiplexer MUX5 and the sixth multiplexer MUX6 can modulate the signal receiving range of the analog/digital converter ADC according to a sensing sequence of the second conductive patterns 221~224. Therefore, when each of the second conductive patterns 221~224 performs the sensing, only a specific signal range can be accepted by the analog/digital converter ADC for conversion. Accordingly, the sensing signals can be effectively filtered to mitigate the sensing error problem.

According to the above steps, it is known that when the first conductive patterns 211~214 and the second conductive patterns 221~224 are conducted at different positions, the corresponding second conductive patterns 221~224 can receive different sensing signals, that is different sensing signals are generated. Therefore, the fifth multiplexer MUX5 and the sixth multiplexer MUX6, for example, determines the signal receiving range of the analog/digital converter ADC according to one of the second conductive patterns 221~224 that performs the touch sensing.

For example, if the first signal V1 is 5 volts, when the first conductive patterns 211~214 perform the scanning, a 0~5 volts voltage gradient distribution can be formed along the first direction D1 in each of the first conductive patterns 211~214. A sensing signal generated at the overlapped area between the first conductive patterns 211~214 and the second conductive pattern 221 is, for example, 0.6~1.4 volts, a sensing signal generated at the overlapped area between the first conductive patterns 211~214 and the second conductive pattern 222 is, for example, 1.6~2.4 volts, a sensing signal generated at the overlapped area between the first conductive patterns 211~214 and the second conductive pattern 223 is, for example, 2.6~3.4 volts, and a sensing signal generated at the overlapped area between the first conductive patterns 211~214 and the second conductive pattern 224 is, for example, 3.6~4.4 volts.

Therefore, when the second conductive pattern 221 performs the sensing, the fifth multiplexer MUX5 and the sixth multiplexer MUX6 can modulate the signal receiving range of the analog/digital converter ADC to an interval of 0.5~1.5 volts. Similarly, when the second conductive patterns 222~224 respectively perform the sensing, the fifth multiplexer MUX5 and the sixth multiplexer MUX6 can modulate the signal receiving range of the analog/digital converter ADC to suitable intervals. If the sensing signal transmitted to the analog/digital converter ADC does not fall within the interval, the sensing signal is regarded as a ghost point, and the analog/digital converter ADC does not convert this sensing signal. Accordingly, the touch apparatus 100 can correctly determine coordinates of the touch position in the first direction D1.

Next, the second demultiplexer DMUX2 respectively transmits the second signal V2 to each of the third ends E3, so that the second conductive patterns 221~224 sequentially perform the scanning. The fourth ends E4 are all connected to the ground signal Vg through the fourth multiplexer MUX4, so that a specific voltage gradient distribution is formed in the second conductive patterns 221~224. In the present embodiment, when the first demultiplexer DMUX1 is activated, the second demultiplexer DMUX2 is deactivated, and when the first demultiplexer DMUX1 is deactivated, the second demultiplexer DMUX2 is activated. Namely, the first demultiplexer DMUX1 and the second demultiplexer DMUX2 can enable the first conductive patterns 211~214 and the second conductive patterns 221~224 to sequentially perform the scanning at different time.

When one of the third ends E3 is input with the second signal V2, the second multiplexer MUX2 sequentially connects the first ends E1 for sensing the first conductive patterns 211~214, and the sensed second sensing signal S2 is transmitted to the analog/digital converter ADC through the third multiplexer MUX3. Thereafter, when the second sensing signal S2 falls within the signal receiving range, the analog/digital converter ADC converts the second sensing signal S2 to output the second coordinate signal A2.

In the present embodiment, the sensing operations performed by the first conductive patterns 211~214 are the same to that performed by the second conductive patterns 221~224, and therefore detailed descriptions thereof are not repeated. Certainly, the converting operation performed by the analog/digital converter ADC is the same as that described in the aforementioned step. Therefore, after the above steps are performed, the second coordinate signal A2 of the touch position P in the second direction D2 can be correctly positioned. Since the touch sensing method of the present invention can easily exclude signals of the ghost points, complicated calculations are not required, which avails mitigating a calculation burden of a driving chip.

Figure 3:
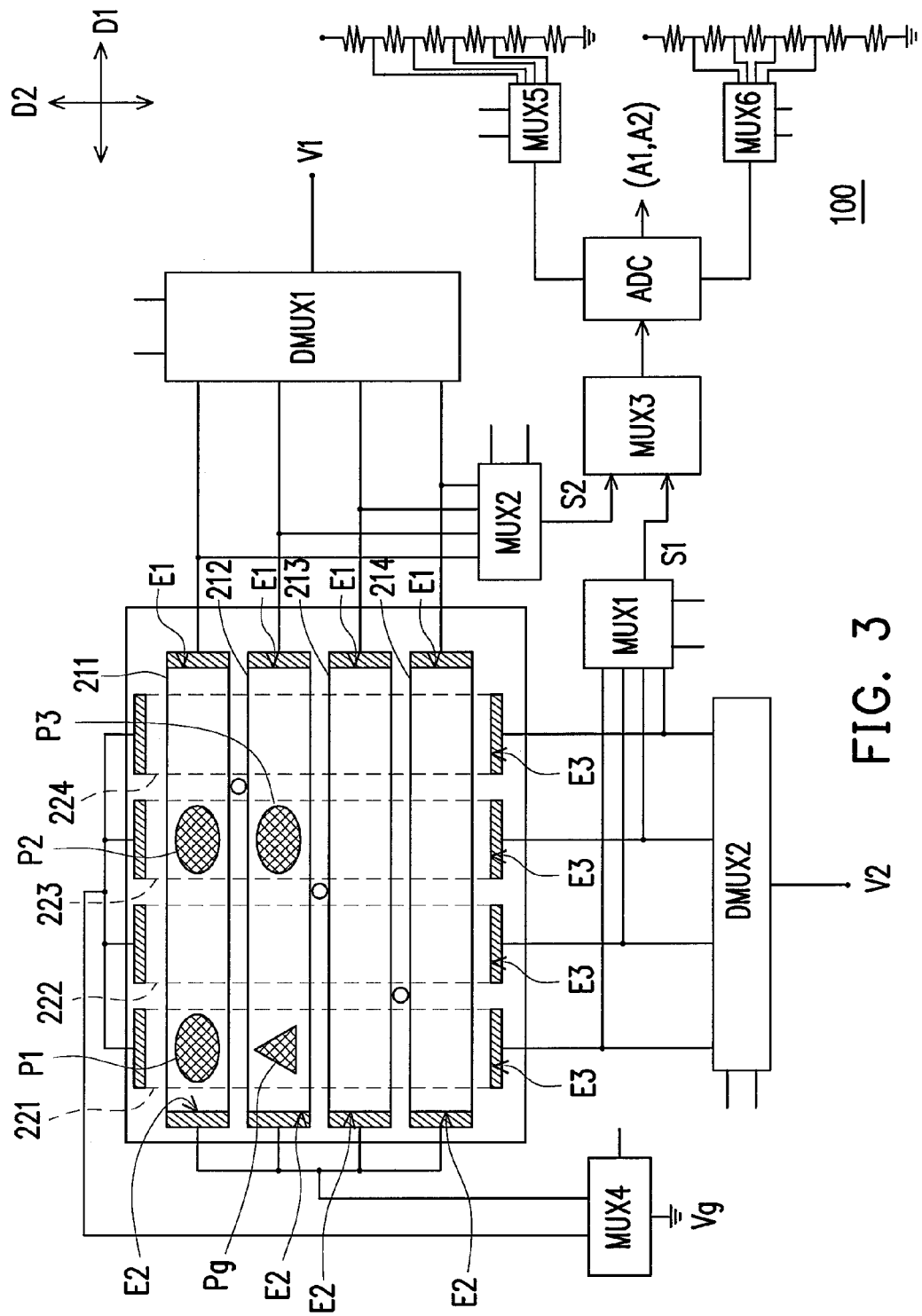
FIG. 3 is a schematic diagram illustrating a multi-touch sensing operation of a touch apparatus according to an embodiment of the present invention.

FIG. 3 is a schematic diagram illustrating a multi-touch sensing operation of a touch apparatus according to an embodiment of the present invention. Referring to FIG. 3, in the present embodiment, the user, for example, simultaneously presses positions P1, P2 and P3 on the touch panel 120. The touch sensing method of the touch apparatus 100 includes the following steps. First, the first demultiplexer DMUX1 respectively transmits the first signal V1 to the first ends E1. Namely, the first conductive patterns 211~214 sequentially perform the scanning.

Assuming the first signal is 5 volts, the fifth multiplexer MUX5 and the sixth multiplexer MUX6, for example, modulate the signal receiving range of the analog/digital converter ADC according to a following principle. When the second conductive pattern 221 performs the touch sensing, the signal receiving range of the analog/digital converter ADC is 0.5~1.5 volts. When the second conductive pattern 222 performs the touch sensing, the signal receiving range of the analog/digital converter ADC is 1.5~2.5 volts. When the second conductive pattern 223 performs the touch sensing, the signal receiving range of the analog/digital converter ADC is 2.5~3.5 volts. When the second conductive pattern 224 performs the touch sensing, the signal receiving range of the analog/digital converter ADC is 3.5~4.5 volts.

When the first conductive pattern 211 performs the scanning, the first multiplexer MUX1 enables the second conductive patterns 221~224 to sequentially perform the touch sensing. When the second conductive pattern 221 performs the touch sensing, the sensing signal of the first conductive pattern 211 corresponding to the position P1 is received, wherein the sensing signal falls from 0.6 to 1.4 volts. Moreover, when the second conductive pattern 223 performs the touch sensing, the sensing signal of the first conductive pattern 211 corresponding to the position P2 falls from 2.6 to 3.4 volts is received. The two sensing signals are all within the signal sensing range of the analog/digital converter ADC, so that the analog/digital converter ADC converts the two signals into the corresponding coordinate signals.

Next, when the first conductive pattern 212 performs the scanning, the second conductive pattern 221 and the second conductive pattern 223 respectively receive a sensing signal when performing the touch sensing. Since the user simultaneously presses the positions P1, P2 and P3, the sensing signal received by the second conductive pattern 221 is, for example, a sensing signal electrically coupled from the position P3 to the position P1 through the position P2, which falls from 2.6 to 3.4 volts. However, when the second conductive pattern 221 performs the touch sensing, the signal sensing range of the analog/digital converter ADC is 0.6~1.4 volts. Therefore, the analog/digital converter ADC regards the sensing signal received by the second conductive pattern 221 as an error signal, and does not perform the conversion.

Moreover, the sensing signal received by the second conductive pattern 223 is a sensing signal corresponding to the position P3, which falls within the signal sensing range of the analog/digital converter ADC. Therefore, the analog/digital converter ADC converts the sensing signal received by the second conductive pattern 223 to output a corresponding coordinate signal.

In the touch sensing method of the present embodiment, after the first conductive patterns 211~214 sequentially perform the scanning, the second conductive patterns 221~224 also perform the scanning sequentially. The first conductive patterns 211~214 sequentially perform the touch sensing, wherein the touch sensing steps of the first conductive patterns 211~214 are the same to that of the second conductive patterns 221~224, so that detailed descriptions thereof are not repeated. It should be noticed that when the second conductive pattern 221 performs the scanning, the first conductive pattern 212 may receive the sensing signal electrically coupled from the position P1 to the position P3 through the position P2, which falls from 0.6 to 1.4 volts. Since the electrically coupled sensing signal does not fall within the signal sensing range (1.5~2.5 volts) of the analog/digital converter ADC, it is regarded as the error signal and is not converted into the coordinate signal.

Since the user simultaneously presses the positions P1, P2 and P3, the conductive patterns may sense a signal of a ghost point Pg due to conduction of these positions. Therefore, during a multi-touch sensing of a conventional resistive touch apparatus, a complicated calculation is generally required for performing an error correction, which may increase a calculation burden of a driving chip. Nevertheless, according to the aforementioned touch sensing method, the signal of the ghost point Pg is regarded as the error signal, and is not converted into a coordinate signal by the analog/digital converter ADC. Therefore, during the multi-touch operation, the touch apparatus 100 can correctly position the touch points without increasing a calculation burden of the driving chip. Moreover, the first conductive patterns 211~214 and the second conductive patterns 221~224 of the present embodiment can respectively perform an analog touch sensing, and the sensing signals thereof can be converted into digital coordinate signals. Therefore, the touch apparatus 100 of the present invention can implement the multi-touch function without increasing a number of the conductive patterns.

In summary, a plurality of multiplexers, a plurality of demultiplexers and an analog/digital converter are used to form a touch sensing circuit of the touch apparatus. Therefore, the touch apparatus of the present invention can correctly perform a single-touch sensing or a multi-touch sensing. Particularly, the touch apparatus of the present invention can easily determine the ghost point when performing the multi-touch sensing, so that complicated calculations are not required, and a calculation burden of the driving chip is mitigated. Moreover, in the touch apparatus of the present invention, configuration of a high density sensing wiring to achieve the multi-touch function is unnecessary, so that a wiring layout of the touch apparatus can be simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch apparatus, comprising:
   a touch panel, comprising:
   a first transparent substrate;
   a plurality of first conductive patterns disposed on the first transparent substrate, being parallel to a first direction, and each of the first conductive patterns having a first end and a second end opposite to the first end along the first direction;
   a second transparent substrate disposed opposite to the first transparent substrate;
   a plurality of second conductive patterns disposed on the second transparent substrate, the first conductive patterns and the second conductive patterns being located between the first transparent substrate and the second transparent substrate, and each of the second conductive patterns being parallel to a second direction, wherein the first direction is intersected to the second direction, and each of the second conductive patterns has a third end and a fourth end opposite to the third end along the second direction;

a plurality of spacers disposed between the first transparent substrate and the second transparent substrate; and a touch sensing circuit, comprising:

a first demultiplexer electrically coupled to each of the first ends for transmitting a first signal;

a second demultiplexer electrically coupled to each of the third ends for transmitting a second signal;

a first multiplexer electrically coupled to each of the third ends for receiving a first sensing signal output from each of the third ends;

a second multiplexer electrically coupled to each of the first ends for receiving a second sensing signal output from each of the first ends;

a third multiplexer electrically coupled to the first multiplexer and the second multiplexer for receiving the first sensing signal and the second sensing signal;

a fourth multiplexer electrically coupling the second ends and the fourth ends to a ground signal;

an analog/digital converter (ADC) electrically coupled to the third multiplexer for outputting a first coordinate signal and a second coordinate signal;

a fifth multiplexer electrically coupled to the ADC; and a sixth multiplexer electrically coupled to the ADC, wherein the fifth multiplexer and the sixth multiplexer are used for modulating a signal receiving range of the ADC.

2. The touch apparatus as claimed in claim 1, wherein the touch panel further comprises:

a plurality of first electrodes, each of the first electrodes being disposed on the first end of one of the first conductive patterns, and being electrically coupled to the first demultiplexer and the second multiplexer;

a plurality of second electrodes, each of the second electrodes being disposed on the second end of one of the first conductive patterns, and being electrically coupled to the fourth multiplexer;

a plurality of third electrodes, each of the third electrodes being disposed on the third end of one of the second conductive patterns, and being electrically coupled to the second demultiplexer and the first multiplexer; and a plurality of fourth electrodes, each of the fourth electrodes being disposed on the fourth end of one of the second conductive patterns, and being electrically coupled to the fourth multiplexer.

3. The touch apparatus as claimed in claim 2, wherein the second electrodes are electrically connected mutually.

4. The touch apparatus as claimed in claim 2, wherein the fourth electrodes are electrically connected mutually.

5. The touch apparatus as claimed in claim 1, wherein the touch panel further comprises:

a plurality of first electrodes, each of the first electrodes being disposed on the first end of one of the first conductive patterns, and being electrically coupled to the first demultiplexer and the second multiplexer;

a second electrode disposed on the second ends of the first conductive patterns to electrically connect the second ends, and the second electrode being electrically coupled to the fourth multiplexer;

a plurality of third electrodes, each of the third electrodes being disposed on the third end of one of the second conductive patterns, and being electrically coupled to the second demultiplexer and the first multiplexer; and a fourth electrode disposed on the fourth ends of the second conductive patterns to electrically connect the fourth ends, and the fourth electrode being electrically coupled to the fourth multiplexer.

6. The touch apparatus as claimed in claim 5, wherein the second electrode and the fourth electrode are respectively a bar shape electrode.

7. A touch sensing method, used in the touch apparatus as claimed in claim 1, the touch sensing method comprising:

respectively transmitting the first signal to each of the first ends by the first demultiplexer;

sequentially electrically connecting with the third ends by the first multiplexer so as to perform a sensing on the second conductive patterns respectively, and transmitting the sensed first sensing signal to the ADC through the third multiplexer when one of the first ends is input with the first signal;

converting the first sensing signal to output the first coordinate signal by the ADC when the first sensing signal falls within the signal receiving range;

respectively transmitting the second signal to each of the third ends by the second demultiplexer;

sequentially electrically connecting the first ends by the second multiplexer so as to perform the sensing on the first conductive patterns, and transmitting the sensed second sensing signal to the ADC through the third multiplexer when one of the third ends is input with the second signal; and converting the second sensing signal to output the second coordinate signal by the ADC when the second sensing signal falls within the signal receiving range.

8. The touch sensing method as claimed in claim 7, wherein when the first sensing signal or the second sensing signal does not fall within the signal receiving range, the ADC regards the first sensing signal or the second sensing signal as an error sensing.

9. The touch sensing method as claimed in claim 7, wherein the signal receiving range is from the first signal to the ground signal or from the second signal to the ground signal.

10. The touch sensing method as claimed in claim 9, wherein when the first multiplexer electrically connects to different one of the third ends, the signal receiving range of the ADC is different accordingly.

11. The touch sensing method as claimed in claim 9, wherein when the second multiplexer connects a different one of the first ends, the signal receiving range of the ADC is different accordingly.

* * * * *